(12) United States Patent
Sakaguchi et al.

(10) Patent No.: US 8,314,895 B2
(45) Date of Patent: Nov. 20, 2012

(54) IMAGE DISPLAY SYSTEM FOR VEHICLE

(75) Inventors: Eiji Sakaguchi, Haga-gun (JP);
Teruyuki Sekine, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 904 days.

(21) Appl. No.: 11/208,279

(22) Filed: Aug. 19, 2005

(65) Prior Publication Data
US 2006/0046549 A1  Mar. 2, 2006

(30) Foreign Application Priority Data

Aug. 27, 2004  (JP) ................. 2004-248145

(51) Int. Cl.
*H04N 5/64* (2006.01)
*H01R 13/15* (2006.01)
*G09G 5/00* (2006.01)

(52) U.S. Cl. .......... 348/837; 439/259; 345/156
(58) Field of Classification Search ......... 348/837; 439/259
See application file for complete search history.

(56) References Cited

U.S. PATENT DOCUMENTS

| | | | |
|---|---|---|---|
| 5,515,174 A * | 5/1996 | Abe et al. | 386/118 |
| 5,522,638 A * | 6/1996 | Falcoff et al. | 296/37.8 |
| 6,530,547 B1 * | 3/2003 | Wada | 248/286.1 |
| 6,979,038 B1 * | 12/2005 | Cho et al. | 296/37.7 |
| 7,069,510 B2 * | 6/2006 | Anderson et al. | 715/716 |
| 7,084,932 B1 * | 8/2006 | Mathias et al. | 348/837 |
| 7,190,798 B2 * | 3/2007 | Yasuhara | 381/86 |
| 2002/0149708 A1 * | 10/2002 | Nagata et al. | 348/837 |
| 2004/0061995 A1 * | 4/2004 | McMahon | 361/681 |
| 2005/0231008 A1 * | 10/2005 | Jaaska, Sr. | 297/188.2 |
| 2005/0236857 A1 * | 10/2005 | Shiomiya | 296/37.7 |

FOREIGN PATENT DOCUMENTS

| | | | |
|---|---|---|---|
| JP | 07107575 A | * | 4/1995 |
| JP | 2002-204409 | | 7/2002 |
| JP | 2002-533258 | | 10/2002 |
| JP | 2003-323126 | | 11/2003 |

OTHER PUBLICATIONS

WO 02/09976 A1, Image Reproducing Device, Publication Date: Feb. 7, 2002.

* cited by examiner

*Primary Examiner* — Waseem Moorad
(74) *Attorney, Agent, or Firm* — Rankin, Hill & Clark LLP

(57) ABSTRACT

An image display system attached to a ceiling of a vehicle includes a main body, attached to the ceiling, having a first housing recess and a second housing recess which is positioned further backward than the first housing recess in a length of the vehicle; a rotatable monitor portion having a display screen, wherein a contained state in which the display screen is contained in the first housing recess and an unfolded state in which the display screen protrudes from the first housing recess are switchable by rotating the display screen, and the display screen is oriented toward a back seat of the vehicle in the unfolded state; and a controller having an operation-face for controlling operation of the image display system, wherein the controller is detachably contained in the second housing recess in a manner such that the operation face is positioned facing downward.

4 Claims, 10 Drawing Sheets

IMAGE DISPLAY SYSTEM FOR VEHICLE

BACKGROUND OF THE INVENTION

1. Field of the Invention

The present invention relates to an image display system provided on a ceiling of a vehicle so as to show images to occupants in back seats.

Priority is claimed on Japanese Patent Application No. 2004-248145, filed Aug. 27, 2004, the content of which is incorporated herein by reference.

2. Description of Related Art

In an example of an image display system provided on a ceiling of a vehicle so as to show images to occupants in back seats, a main body attached to the ceiling and a monitor contained in a housing recess formed in the main body are provided. This monitor can be rotated and can protrude from the housing recess so that the display screen is oriented toward the back seats, and an operation switch is provided on the main body (see Reference 1: Japanese Unexamined Patent Application, First Publication No. 2002-204409). Another example of the image display system also has a main body attached to the ceiling and a monitor contained in a housing recess formed in the main body. This monitor can be rotated and can protrude from the housing recess so that the display screen is oriented toward the back seats, and a controller is detachably contained on the side of the housing recess toward the front of the vehicle body (see Reference 2: PCT International Publication No. WO02/009976).

When the operation switch is provided on the main body which is attached to the ceiling (as disclosed by Reference 1), a passenger who wants to operate the switch must reach the passenger's hand toward the ceiling, which is inconvenient. In particular, when a child wants to operate the switch, the ceiling may be beyond the reach of the child, and the child may not be able to operate the switch.

When the controller is detachably contained in the main body which is attached to the ceiling (as disclosed by Reference 2), the above problem relating to the system as shown by Reference 1 does not occur when the detached controller is used. However, in this case, the controller is contained on the side of the housing recess (for containing the monitor) toward the front of the vehicle body. Therefore, when the monitor protrudes from the housing recess, if a passenger in a back seat tries to detach the controller or operate the contained controller, the monitor obstructs the operation, thereby degrading operational performance.

SUMMARY OF THE INVENTION

In light of the above circumstances, an object of the present invention is to provide an image display system for a vehicle, for improving performance of operations for attaching or detaching the controller to or from the main body and for operating the controller contained in the main body, performed by a passenger in a back seat, even when the monitor is unfolded and protrudes.

Therefore, the present invention provides an image display system (e.g., an image display system 10 in an embodiment explained later) attached to a ceiling (e.g., a ceiling 16 in the embodiment) of a vehicle, the system comprising:

a main body (e.g., a main body 20 in the embodiment), attached to the ceiling, having a first housing recess (e.g., a first housing recess 22 in the embodiment) and a second housing recess (e.g., a second housing recess 24 in the embodiment) which is positioned further backward than the first housing recess in a length of the vehicle;

a rotatable monitor portion (e.g., a monitor portion 33 in the embodiment) having a display screen (e.g., a display screen 35 in the embodiment), wherein a contained state in which the display screen is contained in the first housing recess and an unfolded state in which the display screen protrudes from the first housing recess are switchable by rotating the display screen, and the display screen is oriented toward a back seat (e.g., second-row seats 13 or third-row seats 14 in the embodiment) of the vehicle in the unfolded state; and a controller (e.g., a controller 40 in the embodiment) having an operation face (e.g., an operation face 62 in the embodiment) for controlling operation of the image display system, wherein the controller is detachably contained in the second housing recess in a manner such that the operation face is positioned facing downward.

According to the above structure, the controller is contained in the second housing recess while the operation face is oriented downward, and the second housing recess is positioned to the rear of the first housing recess of the main body (in which the monitor portion is contained) in the length of the vehicle. Therefore, even when the monitor portion is unfolded, the monitor portion does not obstruct the operation of detaching or attaching the controller, or operation of the controller contained in the main body, which are performed by a passenger in the back seat. Accordingly, it is possible to improve the performance of the operation of detaching or attaching the controller and the operation on the controller contained in the main body, performed by the passenger in the back seat.

Preferably, when the controller is contained in the second housing recess, the operation face is inclined in a manner such that the further toward the rear of the vehicle, the higher. Accordingly, it is possible to further improve the performance of operation of the controller, contained in the second housing recess, performed by the passenger in the back seat.

In a typical example, first fitting portions (e.g., pins 45 in the embodiment) are provided in a rear portion of the second housing recess in the length of the vehicle and on either side of the rear portion in a width of the vehicle;

second fitting portions (e.g., holes 72 in the embodiment) which can fit to the first fitting portions are provided on either side of the controller in the width of the vehicle; and the controller is rotatably supported at the second housing recess when the first fitting portions and the second fitting portions are fit to each other.

Preferably, the first fitting portions of the second housing recess are pins (e.g., pins 45 in the embodiment) which can advance and withdraw; and the second fitting portions of the controller are holes (e.g., holes 72 in the embodiment) into which the pins can be inserted.

It is also possible that the second fitting portions of the controller are pins which can advance and withdraw; and the first fitting portions of the second housing recess are holes into which the pins can be inserted.

It is also possible that:

a third fitting portion (e.g., sliders 50 in the embodiment) is provided in a portion of the second housing recess toward the front of the vehicle;

a fourth fitting portion (e.g., fitting holes 64 in the embodiment) which can fit to the third fitting portion is provided in the controller; and the controller is contained in the second housing recess when the first fitting portions and the second fitting portions are fit to each other and the third fitting portion and the fourth fitting portion are fit to each other.

Accordingly, when (the fourth fitting portion of) the controller is removed from the third fitting portion of the second housing recess, so as to detach the contained controller, the controller rotates downward around the first fitting portions, which are fit to the second fitting portions at either side of the controller in the length thereof and are positioned in a rear portion of the second housing recess. In this state, when engagement between the first fitting portions and the second fitting portions is terminated (e.g., when the pins are withdrawn and retracted from the holes), the controller is detached from the second housing recess. In the detachment process, the operation face is oriented toward the rear of the vehicle, that is, toward the passenger in the back seat; thus, it is possible to prevent the passenger in the back seat who detaches the controller from performing wrong operations. In addition, when the pins and the holes are employed, the pins functioning as shafts for supporting the controller simultaneously function as parts for installing the controller to the second housing recess, thereby reducing the number of necessary parts. Furthermore, the controller is rotated when being detached; thus, the passenger can easily grasp the controller and easily perform the attaching and detaching operation.

In this case, preferably:

the first fitting portions of the second housing recess are pins (e.g., pins 45 in the embodiment) which can advance and withdraw, each pin having a tapered head (e.g., a tapered head 48 in the embodiment) and a shaft portion (e.g., a shaft portion 47 in the embodiment) which has a constant diameter;

the second fitting portions of the controller are holes into which the pins can be inserted; and the holes have forms by which the holes are supported by the shaft portions of the pins when the controller is contained in the second housing recess, and are supported by the tapered heads of the pins after the fourth fitting portion of the controller is removed from the third fitting portion of the second housing recess and the controller is rotated downward around the pins.

Accordingly, in the state in which the pins are fit to the holes of the controller and the fourth fitting portion is fit to the third fitting portion, the holes are supported by the shaft portions having a constant diameter of the pins; thus, the pins do not come out of the holes, and the controller can be reliably maintained in the contained state. When (the fourth fitting portion of) the controller is removed from the third fitting portion and rotates downward around the pins which are fit to the holes, the holes are supported by the tapered heads of the pins. Therefore, pulling the controller results in automatic withdrawal of the pins via the tapered heads, and the pins come out of the holes, thereby easily detaching the controller.

Preferably, the third fitting portion is a pair of sliders (e.g., sliders 50 in the embodiment) which can advance and withdraw.

When the first fitting portions of the second housing recess are the pins, and the second fitting portions of the controller are the holes, it is possible that:

the controller has slopes (e.g., slopes 78 in the embodiment) on either side in the width of the vehicle; and each hole is positioned between one of the slopes and the operation face, and the slopes are inclined in a manner such that the further from the operation face, the further inside in the width of the vehicle.

Accordingly, when the controller is pushed into the second housing recess with a posture of the controller corresponding to the contained state, the pins are pushed by the slopes which are formed on the side opposite to the operation face with the hole between, and formed in a manner such that the further from the operation face, the further inside in the width of the vehicle. Therefore, the pins are withdrawn and are then easily fit to the holes. Accordingly, only pushing the controller into the second housing recess alone results in fitting of the pins to the holes.

DETAILED DESCRIPTION OF THE INVENTION

Hereinafter, an image display system for a vehicle, as an embodiment of the image display system according to the present invention, will be described with reference to the Figures.

Figure 1:
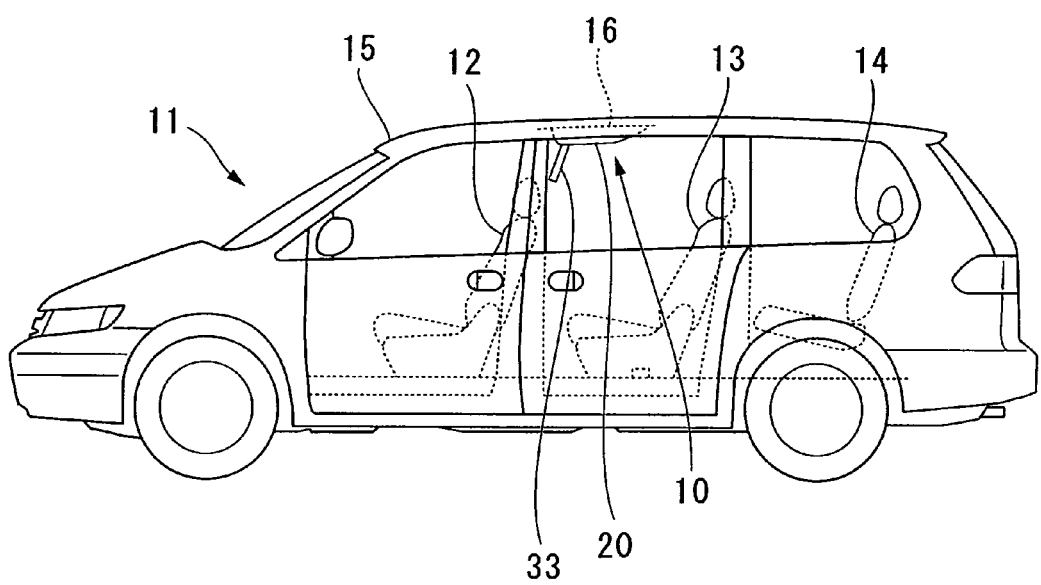
FIG. 1 is a side view showing a vehicle in which an image display system as an embodiment according to the present invention is installed.
Figure 2:
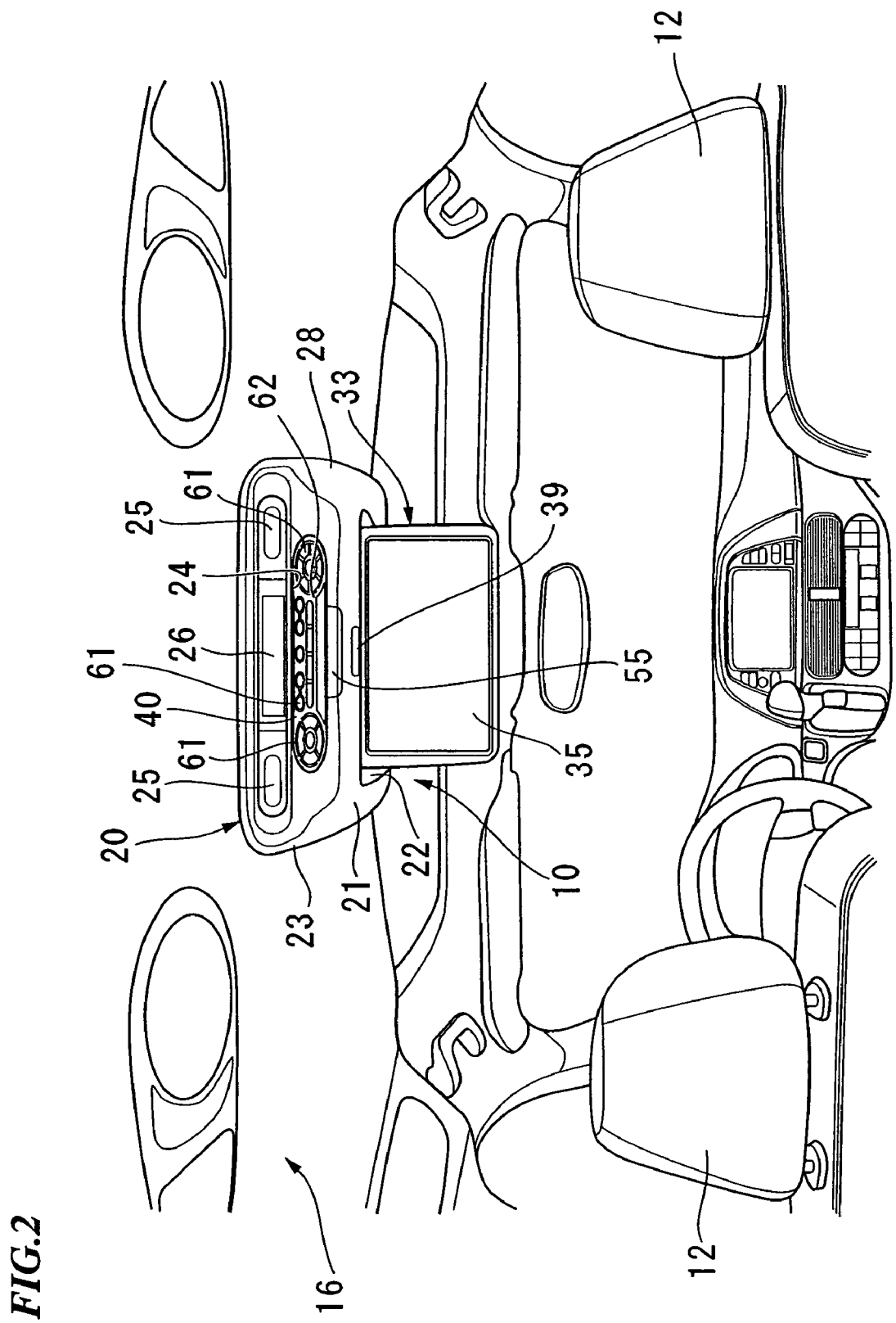
FIG. 2 is a view showing a front portion of the interior of the vehicle, viewed from a second-row seat, in the embodiment.

FIG. 1 is a side view showing a vehicle 11 in which the image display system 10 of the embodiment is installed. FIG. 2 is a view showing a front portion of the interior of the vehicle, viewed from a second-row seat (described below).

The vehicle 11 has a three-row seat structure consisting of the first-row seats 12, the second-row seats 13 (i.e., back seats), and the third-row seats 14 (i.e., back seats), which are arranged in the length of the vehicle. An image display system 10 of the present embodiment is attached to the lower face of the ceiling 16 of the vehicle body 15, at a position between the first-row seats 12 and the second-row seats 13, and at a center position in the width of the vehicle (see FIG. 2).

Figure 3:
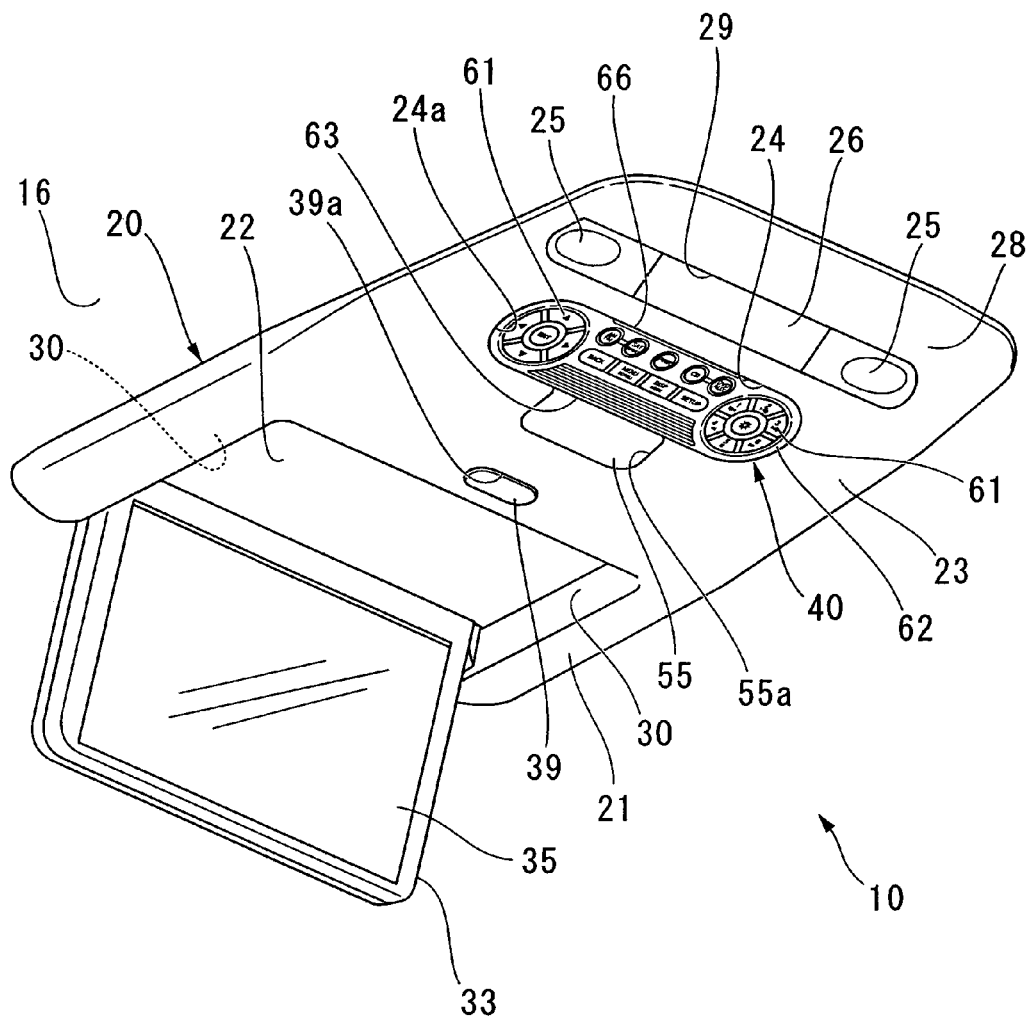
FIG. 3 is a perspective view showing the image display system in the embodiment.

FIG. 3 is a perspective view showing the image display system 10. The image display system 10 has a main body 20 attached to the lower face of the ceiling 16. As shown in FIG. 3, the main body 20 has a lower face 21 which is arranged substantially horizontally toward the front of the vehicle. A first housing recess 22, which is recessed upward, is formed in the lower face 21. More specifically, in this first housing recess 22, only the side toward the front of the vehicle is open, and the side toward the back and the right and left sides are not open (i.e., have walls).

The main body 20 has a slope 23 as a lower face which is formed in a manner such that the further toward the back of the vehicle, the higher. A second housing recess 24, which is recessed upward and is wide in the width of the vehicle, is formed in the slope 23 at its center in the length of the vehicle. Accordingly, the second housing recess 24 is formed to the rear of the first housing recess 22 in the length of the vehicle. In the second housing recess 24, all sides are not open (i.e., have walls).

Also in the slope 23, infrared light receiving and emitting portions 25 are provided to the rear of the second housing recess 24 in the length of the vehicle, and at either side in the width of the vehicle. A small display portion 26 made of liquid crystals or the like is provided between the infrared light receiving and emitting portions 25. The infrared light receiving and emitting portions 25 communicate with a device such as a headphone, and with a controller 40 (explained later). The small display portion 26 shows the operation state of the image display system 10, and the like.

Figure 4:
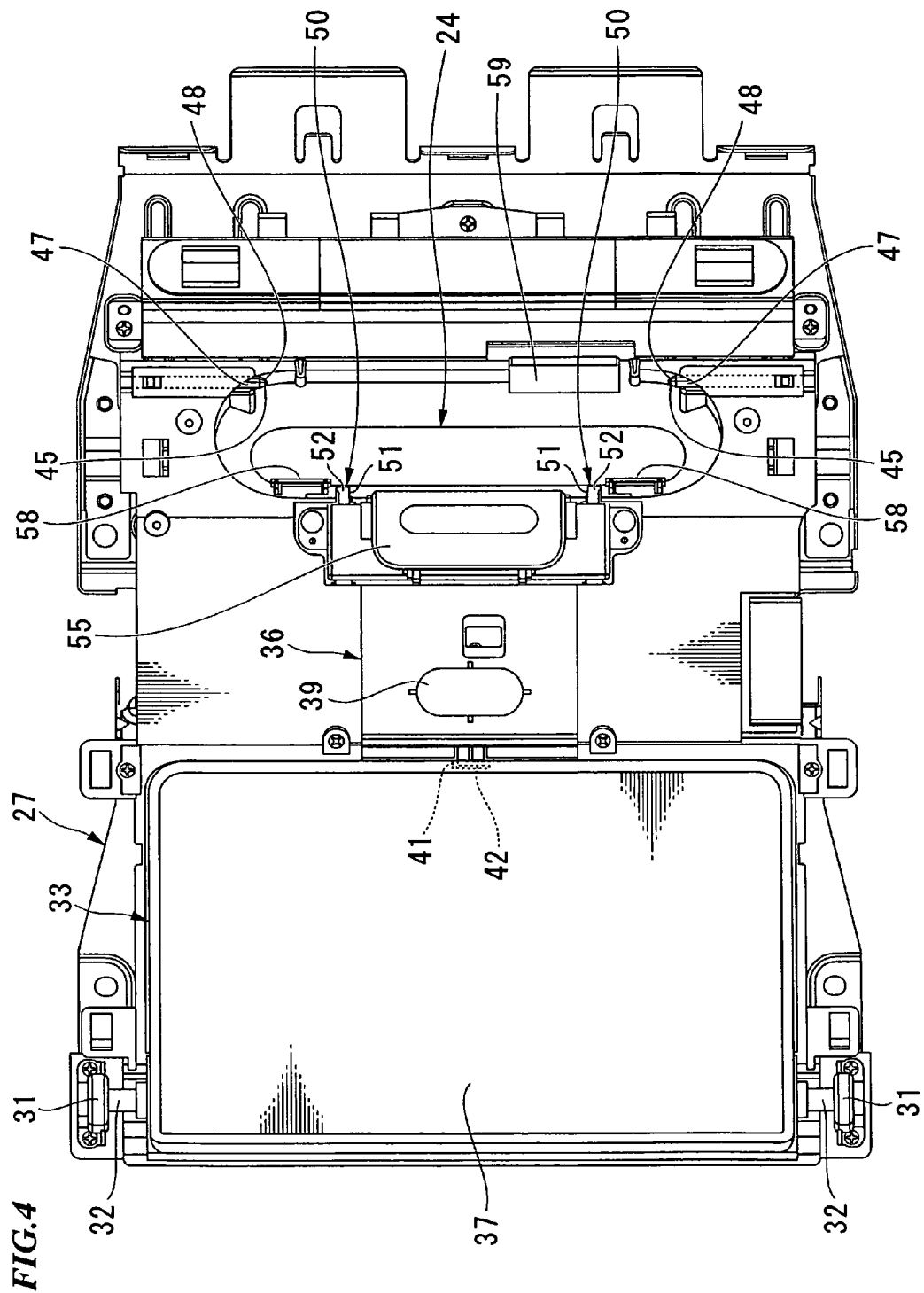
FIG. 4 is a bottom view showing a base and a monitor portion of the image display system in the embodiment.
Figure 5:
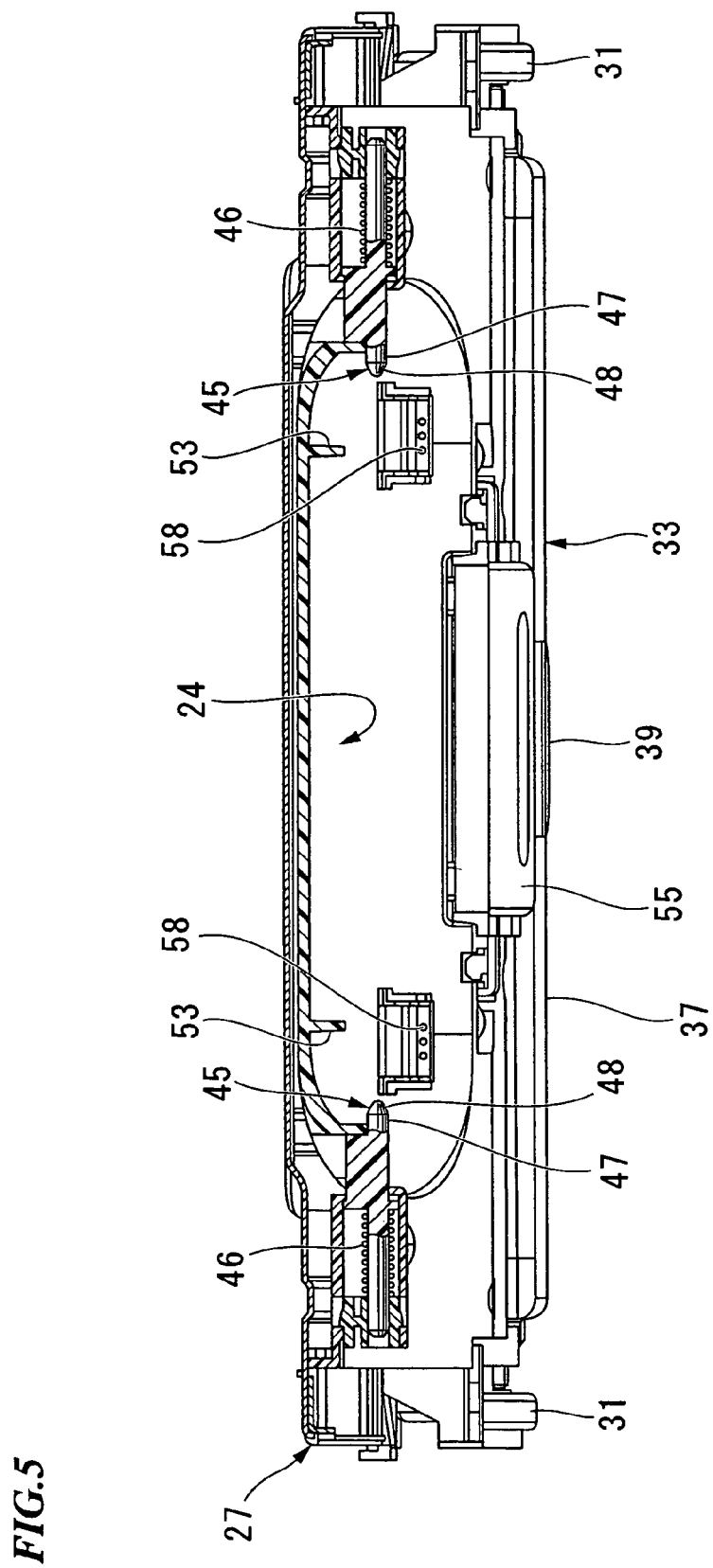
FIG. 5 is a sectional view showing the base and the monitor portion of the image display system, viewed from the rear side of the vehicle, in the embodiment.
Figure 6:
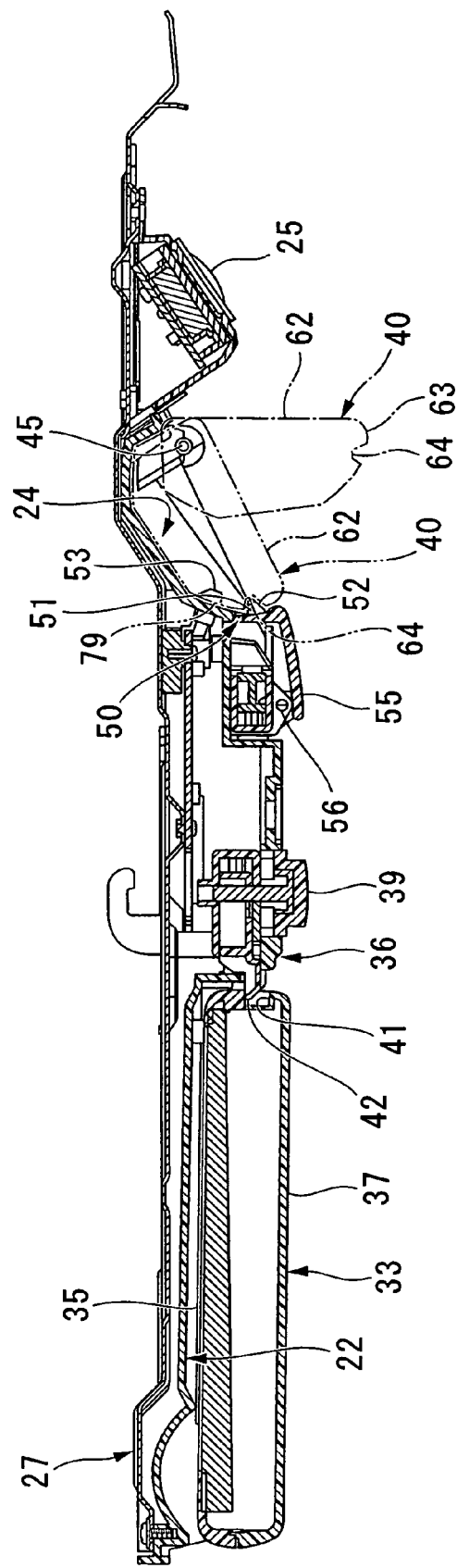
FIG. 6 is a side sectional view showing the base and the monitor portion of the image display system in the embodiment.

FIG. 4 is a bottom view showing a base and a monitor portion of the image display system 10. FIG. 5 is a sectional view showing the base and the monitor portion of the image display system 10, viewed from the rear side of the vehicle. FIG. 6 is a side sectional view showing the base and the monitor portion of the image display system 10.

The main body 20 has a base 27 attached to the lower face of the ceiling 16 (see FIGS. 4 to 6), and a cover 28 attached for covering the lower side of the base 27 (see FIG. 3). The cover 28 includes the above-described lower face 21, the slope 23, a lower portion of the first housing recess 22, an opening 24a of the second housing recess 24, and a fitting hole 29 into which the small display portion 26 and the light receiving and emitting portions 25 at either side are fit. The cover 28 has side walls 30 at either side of the first housing recess 22 in the width of the vehicle (see FIG. 3). At the outside of each side wall in the width of the vehicle, bearings 31 are attached to a portion of the base 27 toward the front of the vehicle. As shown in FIG. 4, the bearings 31 are coaxial in the width of the vehicle. A monitor portion 33 made of liquid crystals or the like is provided between support shafts 32 which are supported by the bearings 31. Accordingly, the monitor portion 33 is supported rotatably around the support shafts 32 and the bearings 31 (provided oriented in the width of the vehicle) for the main body 20.

The monitor portion 33 has two states, a contained state and an unfolded state, which can be changed between by rotating the monitor portion 33. In the contained state, a display screen 35 (see FIG. 3) faces the bottom of the first housing recess 22, and substantially the whole body of the monitor portion 33 is contained in the first housing recess 22. In the unfolded state, the monitor portion 33 protrudes downward from the first housing recess 22 so that the display screen 35 is oriented toward the second-row seats 13 and the third-row seats 14.

As shown in FIGS. 4 and 6, in the main body 20, a monitor engaging mechanism 36 for engaging a fitting protruding portion 42 with a fitting hole 41 of the contained monitor portion 33 (i.e., in the contained state) is provided at the base 27, where the monitor engaging mechanism 36 is positioned to the rear of the first housing recess 22 in the length of the vehicle. The fitting hole 41 is provided in a portion of the contained monitor portion 33 toward the back of the vehicle. When the contained monitor portion 33 is engaged with the monitor engaging mechanism 36, the monitor portion 33 is fixedly maintained in the contained state so that it does not rotate due to its weight.

In the contained state, the back face 37 of the monitor portion 33, that is, the face opposite to the display screen 35, belongs to substantially the same plane as that of the lower face 21 (see FIG. 3) of the main body 20.

In the main body 20, an open and close button 39 is provided to the rear of the first housing recess 22 in the length of the vehicle. In the cover 28, a through hole 39a for exposing the open and close button 39 is formed at a position corresponding to that of the open and close button 39. When this open and close button 39 is pushed upward, the fitting protruding portion 42 is drawn back by the monitor engaging mechanism 36, thereby releasing the engagement with the monitor portion 33. Accordingly, the monitor portion 33 can be unfolded. When the monitor portion 33 is rotated, the monitor portion 33 can be fixed at a plurality of angles. In addition, when the monitor portion 33 is manually returned to the contained state, the fitting protruding portion 42 of the monitor engaging mechanism 36 is automatically engaged with the fitting hole 41 of the monitor portion 33.

The bottom of the second housing recess 24 is positioned to the rear of the open and close button 39 in the base 27 in the length of the vehicle, and the opening 24a of the second housing recess 24 is formed in the cover 28. A detachable controller 40 for operating the image display system 10 is contained in the second housing recess 24 (see FIG. 3). The controller 40 is long in a dimension, which corresponds to a long dimension of the second housing recess 24.

As shown in FIGS. 4 to 6, in the base 27, a pair of pins 45 is provided at either side of the second housing recess 24 in the width of the vehicle, and at a rear portion of the second housing recess 24 in the length of the vehicle. In the second housing recess 24, the pins 45 can advance and withdraw in the width of the vehicle. That is, as shown in FIG. 5, each pin 45 is horizontally supported at the base 27 in a manner such that a portion of the pin 45 protrudes into the second housing recess 24 while the remaining portion is present outside the second housing recess 24 in the width of the vehicle, and the pin 45 can slide within a predetermined length. At the outside of the second housing recess 24 in the width of the vehicle, springs 46 are attached to the base 27, which urge the pins 45 in the direction of protrusion into the second housing recess 24. A portion of each pin 45, which can protrude into the second housing recess 24, has a shaft portion 47 having a constant diameter and a head 48 having a tapered shape.

As shown in FIGS. 4 and 6, in the base 27, a pair of sliders 50 is provided at a front portion of the second housing recess 24 in the length of the vehicle. The sliders are separated in the width of the vehicle, and can advance and withdraw in the length of the vehicle. That is, each slider 50 is supported at the base 27 in a manner such that a portion of the slider 50 protrudes into the second housing recess 24 while the remaining portion is present in front of the second housing recess 24 in the length of the vehicle, and the slider 50 can slide within a predetermined length in the length of the vehicle. On the front side of the second housing recess 24 in the length of the vehicle, springs (not shown) for urging the sliders 50 in the direction of protrusion into the second housing recess 24 are provided at the base 27. As shown in FIG. 6, the lower face of the head 51 of the slider 50 forms a slope 52 in which the closer to the top of the head 51, the higher. As shown in FIG. 5, a pair of positioning protrusions 53, separated from each other in the width of the vehicle, is formed on the bottom of the second housing recess 24.

As shown in FIG. 6, on the front of the second housing recess 24 in the length of the vehicle, a detachment button 55 is attached to the base 27. The detachment button 55 is rotatable around a support shaft 56 which is provided at the front end of the button 55, oriented in the width of the vehicle. When pushing the detachment button 55 upward, the sliders 50 slide toward the front of the vehicle by the action of a cam mechanism (not shown) in opposition to the force applied by the above-described springs (not shown), so that the sliders 50 withdraw and retract from the second housing recess 24. In addition, as shown in FIG. 3, a recessed portion 55a, joined to the opening 24a of the second housing recess 24, is formed in the slope 23 of the cover 28, so as to expose the detachment button 55. Therefore, the position of the recessed portion 55a matches the position of the detachment button 55.

As shown in FIG. 4, in a front portion of the second housing recess 24 of the base 27, terminals 58 are provided for supplying electricity to a battery in the controller 40 when the controller 40 is contained in the second housing recess 24. In a rear portion of the second housing recess 24 of the base 27, a receiving section 59 is provided, which receives signals from the controller 40 when the controller 40 is contained in the second housing recess 24.

The controller 40 is a wireless type and can be detachably contained in the second housing recess 24. As shown in FIGS. 2 and 3, the controller 40 has an operation face 62 in which a plurality of operation buttons 61 is provided. The controller 40 is contained in the second housing recess 24 while the operation face 62 is oriented downward, that is, the controller 40 is installed in the main body 20 in this state. In the installed state, the operation face 62 of the controller 40 and the slope 23 of the main body 20 form substantially the same plane. That is, when the controller 40 is contained in the second housing recess 24, the operation face 62 is inclined in a manner such that the further toward the back of the vehicle, the higher.

Figure 7:
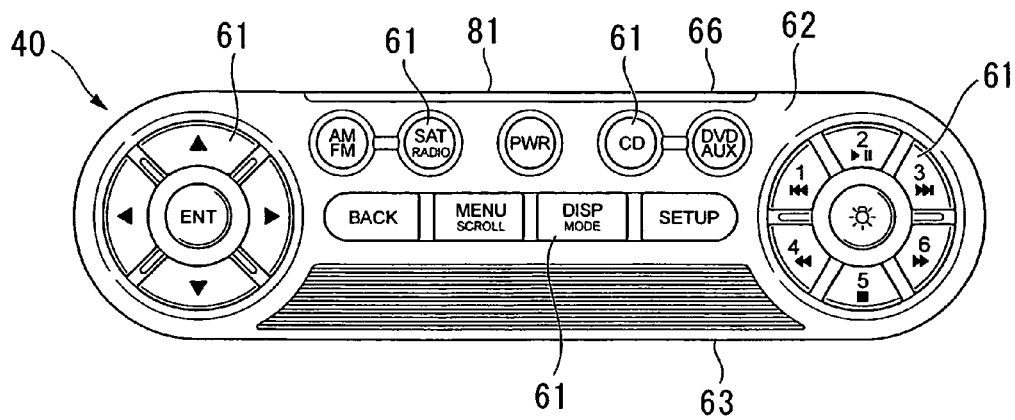
FIG. 7 is a front view of the controller of the image display system in the embodiment.
Figure 8:
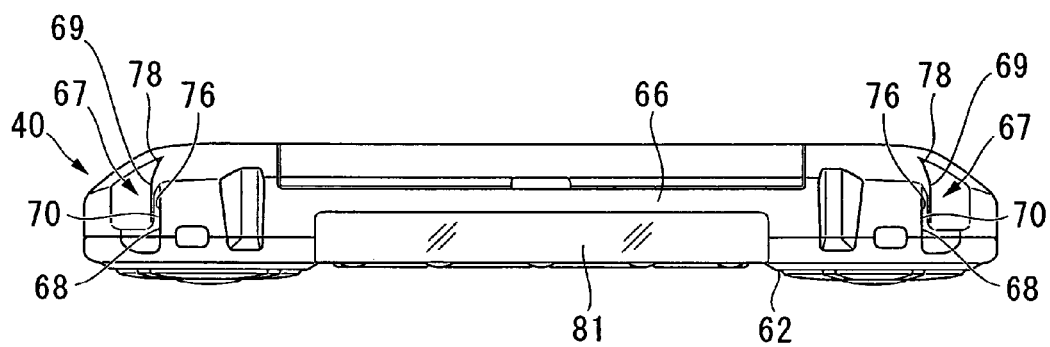
FIG. 8 is a plan view of the controller of the image display system in the embodiment.
Figure 9:
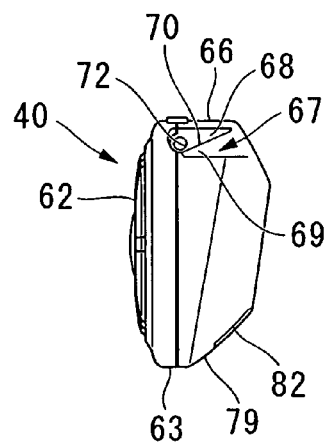
FIG. 9 is a side view of the controller of the image display system, viewed from the right side in FIG. 7, in the embodiment.
Figure 10:
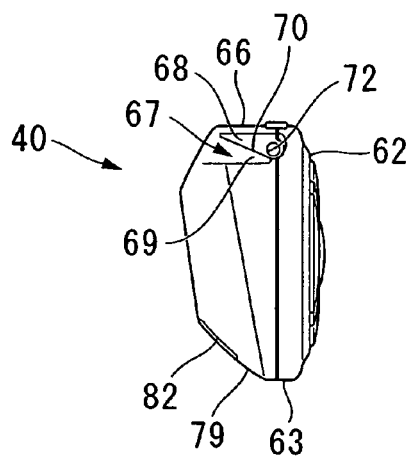
FIG. 10 is a side view of the controller of the image display system, viewed from the left side in FIG. 7, in the embodiment.
Figure 11:
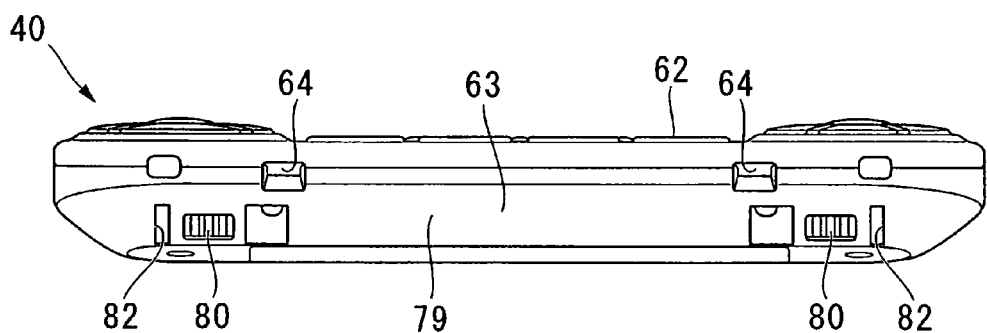
FIG. 11 is a bottom view of the controller of the image display system in the embodiment.
Figure 12:
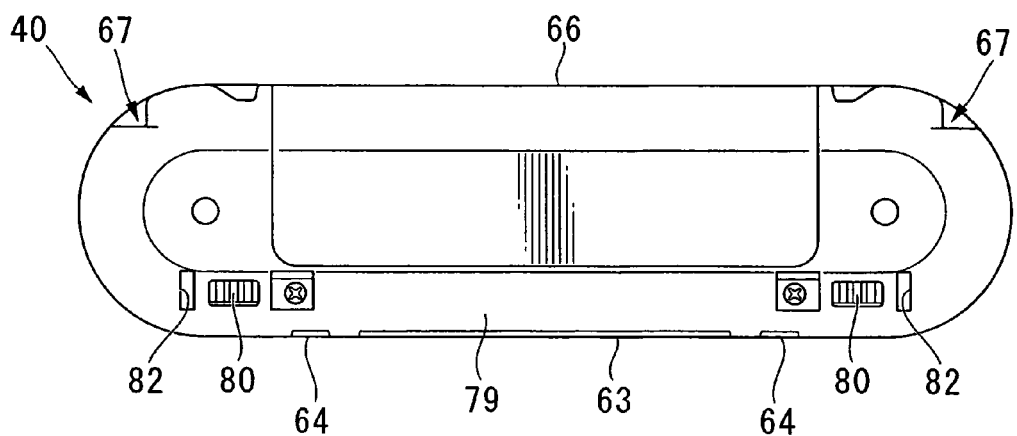
FIG. 12 is a back view the controller of the image display system in the embodiment.
Figure 13:
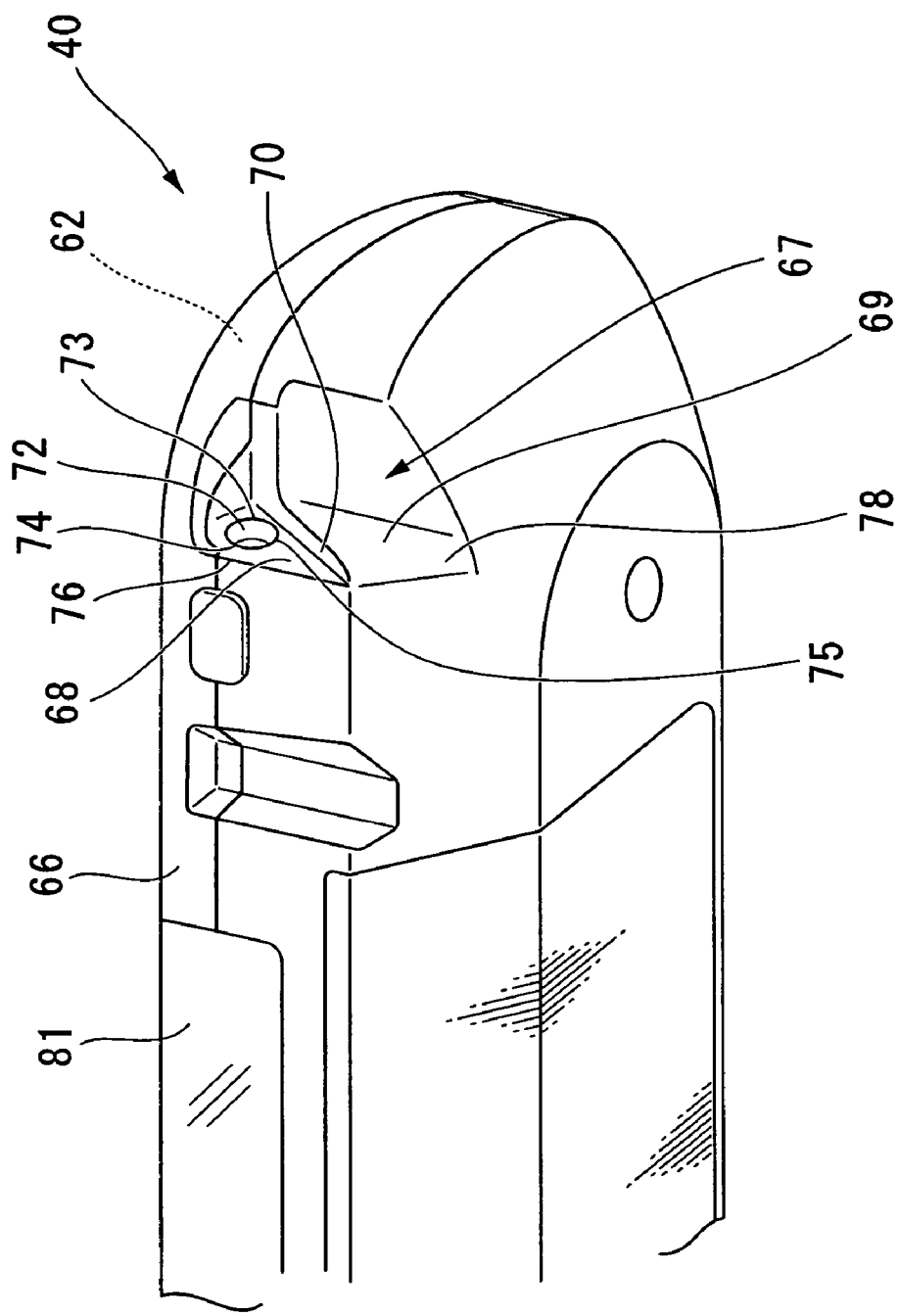
FIG. 13 is an exploded perspective view of the controller of the image display system in the embodiment.

FIGS. 7 and 8 are respectively a front view and a plan view of the controller 40. FIGS. 9 and 10 are side views of the controller 40, respectively viewed from the right side and the left side in FIG. 7. FIGS. 11 to 13 are respectively a bottom view, a back view, and an exploded perspective view of the controller 40.

When the upper portion and the lower portion of the operation face 62 are respectively positioned at the top and the bottom vertically, the upper face 66 of the controller 40 is defined as shown in FIG. 7. On the upper face 66 side, notches 67 are formed on either side in the length of the controller 40 and on the side opposite to the operation face 62 (see FIGS. 8 to 10 and 12). In the lower face 63 opposite to the upper face 66, a pair of fitting holes 64, to which the above-described pair of sliders 50 is fit, is formed (see FIG. 11).

As also shown in FIG. 13, each notch 67 has (i) an inner side face 68 on the upper face 66 side, which is substantially perpendicular to the length of the controller 40, (ii) an outer side face 69, closer to the lower face 63 in comparison with the inner side face 68, further outside in the length of the controller 40 in comparison with the inner side face 68, and substantially perpendicular to the length of the controller 40, and (iii) a step portion 70 between the inner side face 68 and the outer side face 69. The inner side face 68 has an approximately triangular shape formed in a manner such that the further from the operation face 62, the thinner. The outer side face 69 has an approximately triangular shape formed in a manner such that the closer to the operation face 62, the thinner. The step portion 70 is inclined in a manner such that the further from the operation face 62, the closer to the upper face 66.

In an end portion of the inner side face 68, positioned on the operation face 62 side, a hole 72 is formed oriented in the length of the controller 40, into which the pin 45 is inserted and fit. The aperture 73 (i.e., the peripheral edge) of the hole 72 includes the first edge portion 74 on the upper face 66 side and the second edge portion 75 on the side opposite to the operation face 62. The inner side face 68 is inclined in a manner such that the first edge portion 74 is positioned further inward than the second edge portion 75 in the width of the vehicle. A corner 76 is defined between the upper face 66 and the area above the hole 72 in the inner side face 68. The position of the corner 76 matches the position of the above first edge portion 74 in the length of the controller 40. When the pins 45 at either side of the second housing recess 24 in the width of the vehicle (see FIGS. 4 to 6) are fit into the holes 72, the controller 40 is rotatably supported via the pins 45 by the main body 20.

As shown in FIGS. 8 and 13, the controller 40 has side face portions 69 in which slopes 78 are formed on the opposite side to the operation face 62, that is, the hole 72 is formed between the operation face 62 and each slope 78. In addition, the slopes 78 are formed in a manner such that the further from the operation face 62, the closer to each other.

In the controller 40, a slope 79 is formed on the side opposite to the operation face 62 and on the lower face 63 side (see FIGS. 9 and 10). The slope 79 is formed by chamfering a corner of the controller 40 in a manner such that the closer to the lower face 63, the closer to the operation face 62. In the slope 79, terminals 80 are provided (see FIGS. 11 and 12), which contact the above-described terminals 58 in the second housing recess 24 (see FIGS. 4 and 5) when the controller 40 is contained in the second housing recess 24 and thus is installed, so that the terminals 80 can receive electricity. The slope 79 also includes positioning notches 82 to which the above-described positioning protrusions 53 provided in the second housing recess 24 are fit so as to position the controller 40 in the width thereof. In the upper face 66 of the controller 40, a transmitting section 81 is provided, which faces the above-described receiving section 59 in the second housing recess 24 when the controller 40 is contained in the second housing recess 24. The transmitting section 81 sends infrared signals according to operation of the operation buttons 61, to the receiving section 59.

When the controller 40 is contained in the second housing recess 24 (see the two-dot chain line in FIG. 6), the above-described pins 45, which protrude into the second housing recess 24 from either side thereof in the width of the vehicle (see FIGS. 4 to 6), are fit to the holes 72 at either side of the controller 40 (see FIGS. 9, 10, and 13), thereby supporting a portion of the controller 40 toward the back of the vehicle. Simultaneously, the sliders 50, which protrude into the second housing recess 24 from the front side thereof in the length of the vehicle (see FIGS. 4 to 6), are fit to the fitting holes 64 opposite to the holes 72, thereby supporting a portion of the controller 40 toward the front of the vehicle. Therefore, the controller 40 is reliably contained in the second housing recess 24, that is, installed to the main body 20, by fitting the pins 45 on the rear side to the holes 72 and also fitting the withdrawable sliders 50 on the front side to the fitting holes 64.

In this installed state, the operation face 62 of the controller 40 is oriented downward; thus, the upper side of the holes 72

Figure 14:
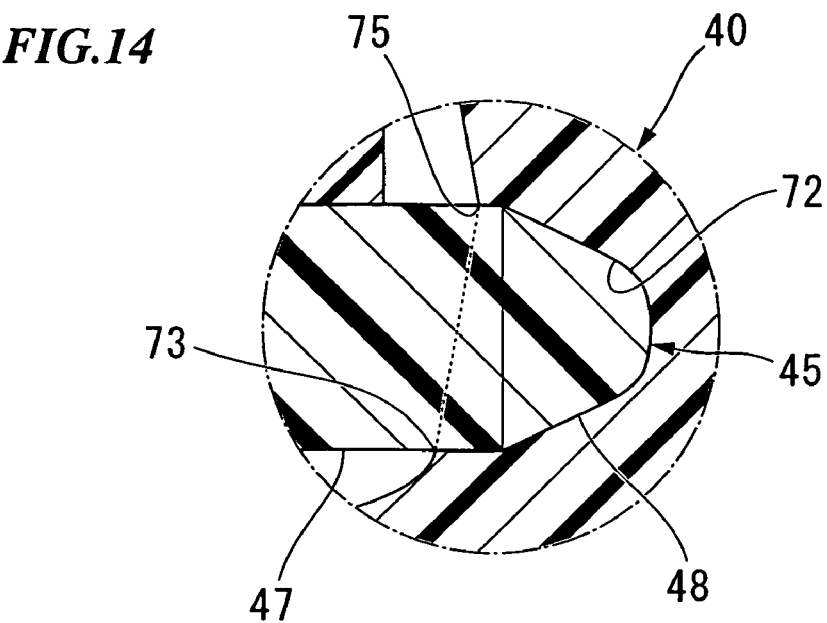
FIG. 14 is an enlarged sectional view showing the relationship between the pin and the hole when the controller is contained in the second housing recess in the embodiment.

(i.e., the furthest from the operation face 62) is supported above the pins 45. FIG. 14 is an enlarged sectional view showing the relationship between the pin 45 and the hole 72 when the controller is contained in the second housing recess 24. As described above, in the aperture 73 (i.e., the peripheral edge) of the hole 72 (see FIG. 13), the second edge portion 75 (furthest from the operation face 62) is positioned further outward than the first edge portion 74 (on the upper face 66 side) in the width of the vehicle. Therefore, as shown in FIG. 14, the second edge portion 75, as the upper side of the aperture 73 in this state, contacts the upper side of the shaft portion 47 having a constant diameter, which is the outer portion of each pin 45 in the width of the vehicle. Therefore, the second edge portion 75 is supported on the upper side of the shaft portion 47. Accordingly, even when a vertical vibration or the like is applied to this supported portion, no force for withdrawing of the pin 45 from the hole 72 is produced, and thus the pin 45 does not come out of the hole 72. Therefore, the controller 40 is reliably maintained in the installed state.

When the operation buttons 61 on the operation face 62 of the controller 40 contained in the second housing recess 24 are operated, the controller 40 outputs operation signals from the transmitting section 81 to the receiving section 59 which faces the transmitting section 81. Based on the operation signals, the operation of the image display system 10 is controlled. In addition, when the controller 40 is contained in the second housing recess 24, the battery built in the controller 40 is fed electricity from the main body 20 side, that is, from the vehicle side.

Figure 15:
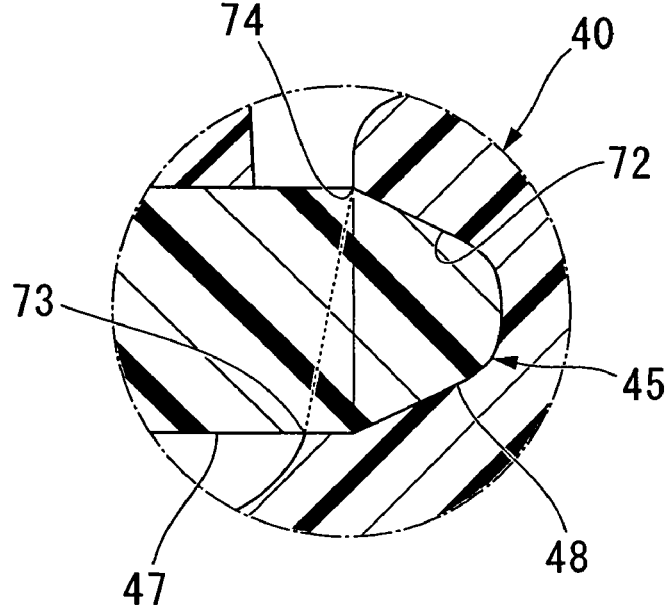
FIG. 15 is an enlarged sectional view showing the relationship between the pin and the hole when the controller protrudes downward from the second housing recess in the embodiment.

When the detachment button 55 (see FIGS. 3, 4, 6, etc.) is pushed upward in the above installed state, the sliders 50 (see FIGS. 4 and 6) slide as to retract from the second housing recess 24, so that the sliders 50 come out of the fitting holes 64 of the controller 40. Accordingly, the controller 40 rotates downward due to its weight around the pins 45 which are fit to the holes 72, and protrudes from the second housing recess 24 in a manner such that the lower face 63 is oriented downward, as shown by the one-dot chain line in FIG. 6 and such that the operation face 62, which was oriented downward, is oriented toward the back of the vehicle. FIG. 15 is an enlarged sectional view showing the relationship between the pin 45 and the hole 72 when the controller protrudes downward from the second housing recess 24. As described above, in the aperture 73 (i.e., the peripheral edge) of the hole 72 (see FIG. 13), the first edge portion 74 (on the upper face 66 side) is positioned further inward than the second edge portion 75 (furthest from the operation face 62) in the width of the vehicle. Therefore, when the position of the controller 40 is changed by rotation, the first edge portion 74 as the upper side of the aperture 73 in this state is supported on the taper-shaped head 48, which is the inner portion of the pin 45 in the width of the vehicle (see FIG. 15). When the controller 40 protruding downward from the second housing recess 24 is pulled downward, downward force is applied from the first edge portion 74 to the taper-shaped head 48 of the pin 45, thereby producing force for withdrawing the pin 45 and easily detaching the pin 45. Accordingly, the controller 40 is detached from the main body 20. Even in the detached state, when the operation buttons 61 on the operation face 62 of the controller 40 are operated, the controller 40 outputs operation signals from the transmitting section 81 to the receiving section 59 or the infrared light receiving and emitting portions 25. The operation of the image display system 10 is controlled based on the operation signals.

When the controller 40 is installed to the second housing recess 24 from the above detached state, basically, the controller 40 is fit to the second housing recess 24 while holding the controller 40 in a posture suitable for the contained state. Accordingly, the slope 52 of each slider 50, which is inclined in a manner such that the further toward the top, the higher (see FIG. 6), contacts the slope 79 of the controller 40, which is similarly inclined in the above posture. Therefore, the force for installing the controller 40, that is, the force in the direction in which the controller 40 is installed, is applied to the slopes 52 and 79, thereby pushing and withdrawing each slider 50. Therefore, the sliders 50 are retracted and then fit to the fitting holes 64. Accordingly, the slopes 78 of the controller 40, which belong to the outer side faces 69 positioned at the top in this state and are positioned opposite to the operation face 62, contact the tapered heads 48 of the pins 45 which protrude toward the inside from either side of the second housing recess 24 in the width of the vehicle. In each slope 78, the further from the operation face 62, the further inside in the width of the vehicle. Therefore, when the force in the direction in which the controller 40 is installed is applied to the slopes 78 and the tapered heads 48, the pins 45 are pushed in the withdrawing direction. Accordingly, the pins 45 are retracted and then fit to the holes 72, and the controller 40 is contained in the second housing recess 24.

In addition, when the controller 40 is installed to the second housing recess 24 from the detached state, the upper face 66 side of the controller 40 may be inserted between the pins 45 while the lower face 63 side is positioned below. As described above, the position of each corner 76, which is defined between the upper face 66 and the upper side of the hole 72 in the inner side face 68, matches the position of the first edge portion 74 at the upper face 66 side, in the aperture 73 of each hole 72. Therefore, in this case, the corners 76 at either side contact the tapered heads 48 of the pins 45. When the controller 40 is pushed upward in this state, upward force is applied from the corners 76 to the heads 48 of the pins 45; thus, force for withdrawing the pins 45 is applied to the tapered heads 48. Therefore, the pins 45 are retracted and then fit to the holes 72. In this state, when the controller 40 is rotated around the pins 45 which are fit to the holes 72 so as to install the controller 40 to the second housing recess 24, the slope 52 of each slider 50, which is inclined in a manner such that the further top, the higher, contacts the corresponding slope 79 of the controller 40, which is similarly inclined. Accordingly, the force in the direction in which the controller 40 is installed is applied to the slopes 52 and 79, thereby pushing and withdrawing the sliders 50. Therefore, the sliders 50 are retracted and then fit to the fitting holes 64. The controller 40 can be contained in the second housing recess 24 also according to the above method.

According to the image display system 10 of the above-explained embodiment, the controller 40 is contained in the second housing recess 24 while the operation face 62 is oriented downward, and the second housing recess 24 is positioned to the rear of the first housing recess 22 of the main body 20 (in which the monitor portion 33 is contained) in the length of the vehicle. Therefore, even when the monitor portion 33 is unfolded, the monitor portion 33 does not obstruct the operation of detaching or attaching the controller 40, or operation of the controller 40 contained in the main body 20, which are performed by a passenger in the second-row seats 13 toward the rear of the vehicle. Accordingly, it is possible to improve the performance of the operation of detaching or attaching the controller 40 and the operation on the controller 40 contained in the main body 20, performed by the passenger in the second-row seats 13.

In addition, in the contained state, the operation face 62 of the controller 40 is inclined in a manner such that the further toward the rear of the vehicle, the higher. Therefore, it is possible to further improve the performance of operation of the controller 40, contained in the second housing recess 24, performed by the passenger in the second-row seats 13.

When the controller 40 is removed from the withdrawable sliders 50 positioned in a portion of the second housing recess 24 toward the front of the vehicle, so as to detach the contained controller 40, the controller 40 rotates around the pair of pins 45, which are fit to the holes 72 at either side of the controller 40 in the length thereof and are positioned in a rear portion of the second housing recess 24, and protrude from either side of the second housing recess 24 in the width of the vehicle. In this state, when the pins 45 are withdrawn and retracted from the holes 72, the controller 40 is detached from the second housing recess 24. In the detachment process, the operation face 62 is oriented toward the rear of the vehicle, that is, toward the passengers in the second-row seats 13; thus, it is possible to prevent a passenger in the second-row seats 13 who detaches the controller 40 from performing wrong operations. In addition, the pins 45 functioning as shafts for supporting the controller 40 simultaneously function as parts for installing the controller 40 to the second housing recess 24, thereby reducing the number of necessary parts. Furthermore, the controller 40 is rotated when being detached; thus, the passenger can easily grasp the controller 40 and easily perform the attaching and detaching operation.

In addition, in the state in which the pins 45 are fit to the holes 72 of the controller 40 and the sliders 50 are also fit to the controller 40, the holes 72 are supported by the shaft portions 47 having a constant diameter of the pins 45; thus, the pins 45 do not come out of the holes 72, and the controller 40 can be reliably maintained in the contained state. When the controller 40 is removed from the sliders 50 and rotates downward around the pins 45 which are fit to the holes 72, the holes 72 are supported by the tapered heads 48 of the pins 45. Therefore, pulling the controller 40 results in automatic withdrawal of the pins 45 via the tapered heads 40, and the pins 45 come out of the holes 72, thereby easily detaching the controller 40.

When the controller 40 is pushed into the second housing recess 24 with a posture of the controller 40 corresponding to the contained state, the pins 45 are pushed by the slopes 78 which are formed on the side opposite to the operation face 62 with the hole 72 between, and formed in a manner such that the further from the operation face 62, the further inside in the width of the vehicle. Therefore, the pins 45 are withdrawn and are then easily fit to the holes 72. Accordingly, only pushing the controller 40 into the second housing recess 24 alone results in fitting of the pins 45 to the holes 72.

In the above embodiment, the pins 45 which can protrude and withdraw are provided in a rear portion of the second housing recess 24 in the length of the vehicle and at either side in the width of the vehicle, and the holes 72 to which the pins 45 are fit are provided at either side of the controller 40 in the length thereof. However, such holes may be provided in a rear portion of the second housing recess 24 in the length of the vehicle and at either side in the width of the vehicle, and pins, which can protrude and withdraw and fit to the holes, may be provided at either side of the controller 40 in the length thereof. In this case, the pins are formed so as to satisfy the conditions such that (i) in the installed state in which the controller 40 is contained in the second housing recess 24, the horizontal lower portion of each pin is supported by a lower portion of the aperture of the corresponding hole, and (ii) when the controller 40 rotates downward and protrudes from the second housing recess 24, a lower portion of each pin, which is inclined in a manner such that the further toward the top (or end) of this lower portion, the higher, is supported by a lower portion of the aperture of the corresponding hole. Accordingly, the controller 40 can be reliably maintained in the installed state while the controller 40 can be easily detached.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display system comprising:
a main body attached to a ceiling of a vehicle, the main body having a first housing recess and a second housing recess whereby the second housing recess is positioned further backward toward a rear of the vehicle than the first housing recess;
a monitor portion having a display screen, the monitor portion being rotatably attached to the main body such that the monitor portion rotates between a contained state in which the display screen is contained in the first housing recess and an unfolded state in which the display screen protrudes from the first housing recess, wherein in the unfolded state the display screen is oriented toward a back seat of the vehicle;
a remote controller having an operation face for controlling operation of the image display system, wherein the remote controller is detachably contained in the second housing recess,
first fitting portions provided in a base of the main body near a rear portion of the second housing recess in a length direction of the vehicle and on either side of the rear portion in a width direction of the vehicle, the first fitting portions including pins that slide a predetermined distance in a width direction of the vehicle into and out of the base;
second fitting portions to receive the first fitting portions, the second fitting portions being holes defined on each side of the remote controller in the width direction of the vehicle;
a third fitting portion provided in a portion of the second housing recess toward a front of the vehicle; and
a fourth fitting portion which can fit to the third fitting portion provided in the remote controller,
wherein when the first fitting portions engage the second fitting portions and the third fitting portion engage the fourth fitting portion the remote controller is removably attached to the base of the main body such that the remote controller is contained in the second housing recess,
wherein when the third fitting portion is disengaged from the fourth fitting portion and the first fitting portions are engaged with the second fitting portions the remote controller rotates about the first fitting portions such that that the remote controller remains removably attached to the base of the main body, and
wherein when the remote controller is rotatably attached to the base, the operation face is oriented toward the rear of the vehicle such that the operation face is substantially perpendicular to the base of the main body and when the remote controller is contained in the second housing recess, the operation face is inclined with respect to the base such that a portion of the remote controller closest to the rear of the vehicle is higher than a portion of the remote controller furthest from the rear of the vehicle.

2. The image display system as claimed in claim 1,
wherein the remote controller has slopes on either side in the width direction of the vehicle,
wherein each hole is positioned between one of the slopes and the operation face, and
wherein the slopes are inclined in a manner such that the further that the slopes extend from the operation face, the closer the slopes are to each other in the width direction of the vehicle.

3. The image display system as claimed in claim 1, wherein the third fitting portion is a pair of sliders which can advance and withdraw.

4. The image display system as claimed in claim 1, wherein when the monitor is in an unfolded state the monitor does not obstruct access to the remote controller by an occupant seated in the back seat of the vehicle.

* * * * *